United States Patent [19]

Alsop

[11] Patent Number: 4,722,639
[45] Date of Patent: Feb. 2, 1988

[54] CONTROLLING EROSION OF RIVER OR SEA BEDS

[76] Inventor: Peter Alsop, St. Georges House, Ivychurch, Kent, United Kingdom

[21] Appl. No.: 784,686
[22] PCT Filed: Jan. 29, 1985
[86] PCT No.: PCT/GB85/00040
    § 371 Date: Sep. 30, 1985
    § 102(e) Date: Sep. 30, 1985
[87] PCT Pub. No.: WO85/03318
    PCT Pub. Date: Aug. 1, 1985

[30] Foreign Application Priority Data

Jan. 30, 1984 [GB] United Kingdom ................. 8402361

[51] Int. Cl.⁴ ............................................... E02B 3/04
[52] U.S. Cl. ...................................... 405/25; 405/24; 405/21
[58] Field of Search .................... 405/24, 74, 172, 25, 405/21; 119/3; 52/155, 158, 159, 162, 163, 165

[56] References Cited

U.S. PATENT DOCUMENTS

| | | | |
|---|---|---|---|
| 1,031,077 | 7/1912 | Maher et al. | 405/74 |
| 3,299,640 | 1/1967 | Nielsen . | |
| 3,540,415 | 11/1970 | Bromley | 119/3 |
| 3,590,585 | 7/1971 | De Winter | 405/24 |
| 3,726,096 | 1/1973 | Bahre . | |
| 3,727,411 | 4/1973 | Rhodes | 405/24 |
| 3,888,057 | 6/1975 | Zubke | 52/163 |
| 4,003,169 | 1/1977 | Young, II | 52/155 |
| 4,130,994 | 12/1978 | Van Moss, Jr. | 405/24 |
| 4,337,007 | 6/1982 | Smith | 405/24 |
| 4,437,786 | 3/1984 | Morrisroe | 405/24 |
| 4,441,453 | 4/1984 | McMickle et al. | 119/3 |
| 4,490,071 | 12/1984 | Morrisroe | 405/24 |
| 4,534,675 | 8/1985 | Morrisroe | 405/24 |
| 4,540,041 | 9/1985 | Backlund | 405/172 |
| 4,641,997 | 2/1987 | Lauer et al. | 405/21 |

FOREIGN PATENT DOCUMENTS

| | | | |
|---|---|---|---|
| 45437 | 4/1971 | Australia . | |
| 2091732 | 1/1972 | France . | |
| WO84/4041-18 | 10/1984 | PCT Int'l Appl. . | |
| WO85/03539 | 8/1985 | PCT Int'l Appl. | 405/24 |
| 1176772 | 1/1970 | United Kingdom | 405/24 |
| 2085386 | 4/1982 | United Kingdom . | |
| 2127469 | 4/1984 | United Kingdom | 405/24 |

Primary Examiner—Richard J. Scanlan, Jr.
Assistant Examiner—Anthony Knight
Attorney, Agent, or Firm—Lane & Aitken

[57] ABSTRACT

A frond line (10) for filtering particulate material from currents flowing over a river or sea bed comprises a substantially continuous curtain of randomly overlapping elongate buoyant elements (15) extending transversely in a common direction from a longitudinally folded web (35), the base of each element (15) being gripped between the superposed portions of the folded web. A frond mat is produced by combining spaced parallel rows of the frond lines (10) with spaced generally parallel cross-straps (13) to provide an open grid mat structure. Anchoring straps (20) depend from the mat, each strap carrying a ground anchor plate (12) which is driven into the river or sea bed by a powered driving tool. The frond line (10) is produced by laying discrete transverse strips (31) of synthetic buoyant material along the web (35) so that equal lengths extend from opposite sides of the web (35), folding the web (35) longitudinally, and then securing the superposed portions of the web to one another.

14 Claims, 8 Drawing Figures

CONTROLLING EROSION OF RIVER OR SEA BEDS

Previous attempts to combat erosion of the sea bed around structures such as offshore oil or gas pipelines have included the planting of a bed of artificial reeds or 'fronds' alongside the structure. Such beds have also been planted in coastal waters to combat erosion of the coast by creating artificial sandbanks or stabilizing existing sandbanks.

In U.S. Pat. No. 4,337,007, for example, it is suggested that the fronds or reeds are first secured in separate bunches to a matting, and this matting is then staked to the sea bed. One obvious disadvantage of this system is that such matting is expensive and subject to secondary scour, particularly when using dead-weight anchoring such as chains and concrete weights.

A further disadvantage is that each bunch of fronds must be individually tied to the matting, and the gaps between the bunches can produce undesirable undulations in the sea bed beneath the matting. Over a period of time local stresses produced by viscous drag on each individual bunch of fronds can be sufficient to detach the bunches from the matting.

In one alternative system as described, for example, in U.S. Pat. No. 3,299,640, a continuous line or row of buoyant synthetic filaments, threads or tapes are secured to a common anchor line which rests on the river or sea bed. It is suggested that several rows of filaments may then be positioned one behind the other.

In practice, however, systems such as those described in U.S. Pat. No. 3,299,640 have failed to work satisfactorily for a number of reasons.

Firstly, it has been found that the buoyant filaments are at least partially flattened by underwater currents, particularly in deep waters, and therefore produce only a low order viscous drag for a short height above the base of the filaments. At best, therefore, a low profile non-permanent sand bank is created around the base. Even this bank is liable to be swept away by following currents of marginally higher velocity.

Experience has shown therefore that such frond lines retain only a small bulk of particles and cannot provide a consolidated sandbank.

Secondly, no satisfactory method has yet been found for laying these lines and anchoring them to the sea or river bed. In U.S. Pat. No. 3,299,640 it is suggested that the lines may comprise either dead-weight anchor lines formed of concrete, lead or steel, or flexible anchor lines consisting of rope or cord provided with dead-weight sinkers.

Both these arrangements would suffer from secondary scour around the line and/or the sinkers, and none of the described arrangements would be capable of holding down the lines against the enormous buoyancy forces and currents which would be experienced in deep waters.

Thirdly, no satisfactory method has yet been devised for attaching filaments or tapes to flexible anchor lines. In particular the suggestion in U.S. Pat. No. 3,299,640 that the filaments or tapes could be lashed, woven or braided into an anchor rope would be a tedious and time-consuming process unsuited for the high speed bulk production which is necessary if sufficient quantities are to be produced for covering large areas such as those surrounding oil or gas pipelines.

An object of the present invention is to provide a practical erosion control system which overcomes these drawbacks, the system including frond lines capable of withstanding the strong underwater currents experienced in deep waters and thereby creating consolidated permanent sandbanks.

In accordance with one aspect of the present invention, there is provided a frond line for filtering particulate material from currents flowing over a river or sea bed, the line comprising a substantially continuous curtain of elongate buoyant elements or artificial reeds extending transversely in a common direction from a flexible anchor line, the elements at least partially overlapping one another to provide the required density of elements along the line.

Each element preferably comprises a strand or filament in a strip having a contracted width, a plurality of the strips being closely spaced along the anchor line with the base of each strip secured to the line. The contracted width is obtained, for example, by the use of fibrillated strips having a natural crimp or crinkle. The strands or filaments in each strip therefore overlap one another in a random manner. Further overlapping is then achieved by overlying the strips with a further sequence of strips, the further sequence being provided, for example, by initially providing strips having equal lengths extending in opposite directions from the anchor line and then folding over the strips so that both ends extend in a common direction. The combined width of the strips when uncrinkled or smoothed out is at least double the length of the anchor line, and is about four times this length when folded strips are used.

The resulting high density of the frond elements ensures that the elements are not flattened by underwater currents, particularly when backed up by further rows of the frond lines, the resulting mass of fronds creating sufficient viscous drag and deposition to build-up a permanent consolidated sand bank.

The anchor line preferably comprises a pair of superposed webs, the base of each element being gripped between the two webs. The two webs are conveniently formed by folding a single web longitudinally.

The array of frond lines is then preferably combined into a frond mat by means of spaced cross-over straps providing an open grid network which can be rolled up for subsequent deployment over the sea bed, each cross-over strap then being anchored at both ends. Such a mat is able to generate a mass fibre-reinforced bank of compacted particles which are shaken or vibrated into position by the action of the water on the frond strands. As a result, a high order of homogeneity and particle pack density is achieved, and it would require current velocities of a far greater magnitude than those initially retarded to create the bank in order to even disturb the bank. Moreover, these currents would have to be applied for a far greater period of time. The bank therefore affords stable, long-term protection to underwater structures, and only high velocity water jetting could be used to open up the bank to gain access for repairs.

The exceptionally high density of the fronds produces correspondingly high buoyancy forces on the mat so that conventional dead-weight anchoring systems would be incapable of holding down the mat. In a preferred embodiment of the present invention the mat is provided with dependent anchoring straps fitted with ground anchors.

The ground anchors preferably comprise anchor plates attached at the end of the anchor straps, each plate including means for engaging a powered driving tool such that a leading edge of the plate is driven into the river or sea bed to a depth not exceeding the length of the anchor strap, this length preferably being adjustable.

Each plate preferably includes a pair of slots for receiving the anchor strap, the arrangement being such that the plates tend to rotate to a skew position when a lifting force is applied to the anchor strap after the plate has been driven into the ground. The use of such a ground anchoring system has the advantage of not being subject to secondary scour and provides a firm anchorage capable of holding the entire frond mat against both buoyancy and current forces in deep waters.

The open grid structure of the frond mat also prevents secondary scour and allows 'fall-through' of particles so that the mat does not have to be in intimate contact with the sea bed. The mat is flexible so that it can follow the sea bed contour while being progressively unwound from a roll. It can therefore be deployed under difficult sea conditions, particularly since the use of plate anchors provides a fast and effective anchoring system.

In the accompanying drawings, by way of example only.

Figure 1:
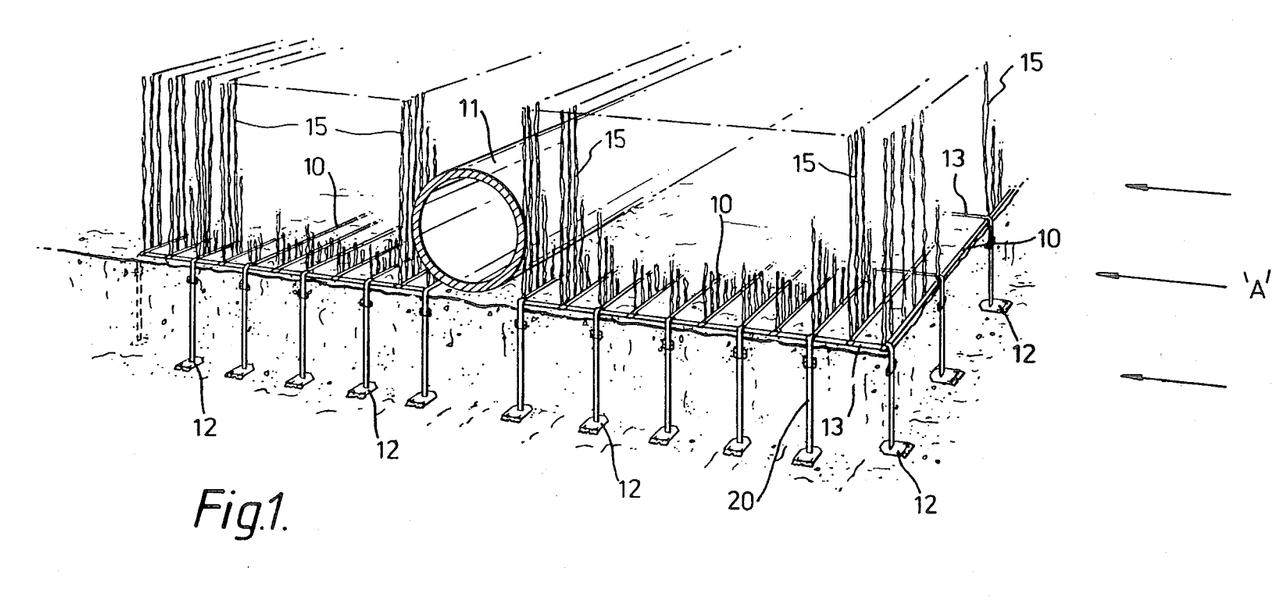
FIG. 1 illustrates diagrammatically the use of a pair of frond mats embodying the invention and disposed on the sea bed to prevent erosion beneath a pipeline resting on the bed, the Figure illustrating the state of the bed immediately after the mats have been laid.
Figure 2:
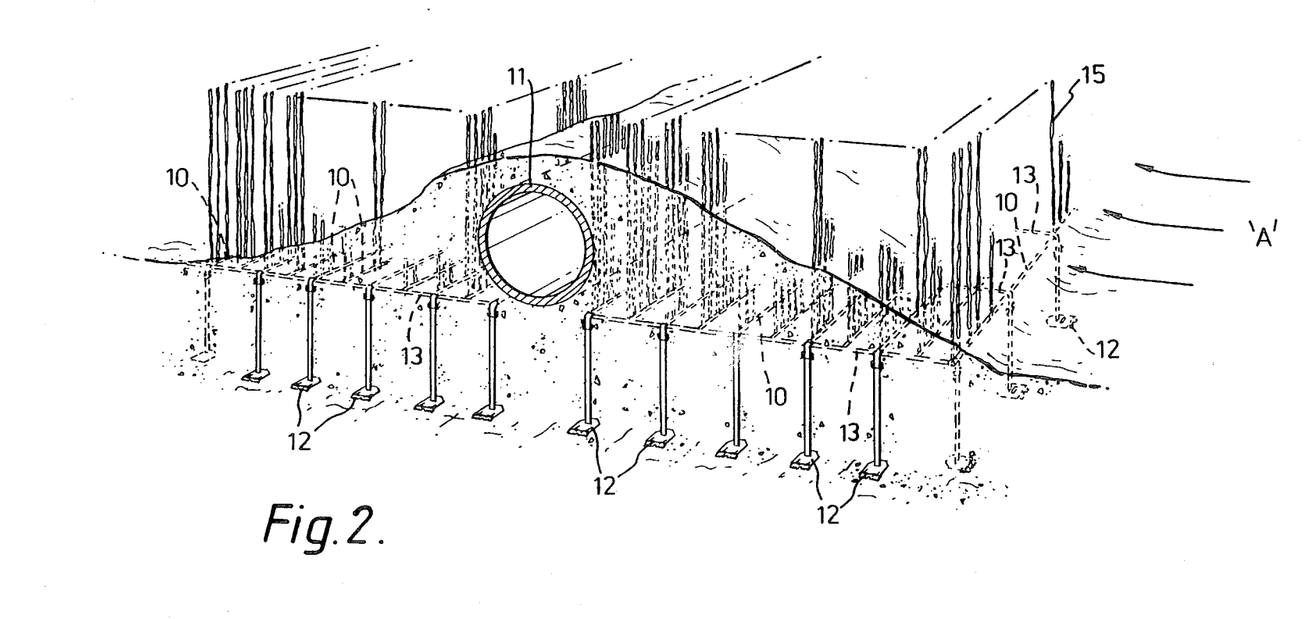
FIG. 2 illustrates the state of the bed some time later and shows the creation of a permananent consolidated sand bank around the pipeline.
Figure 3:
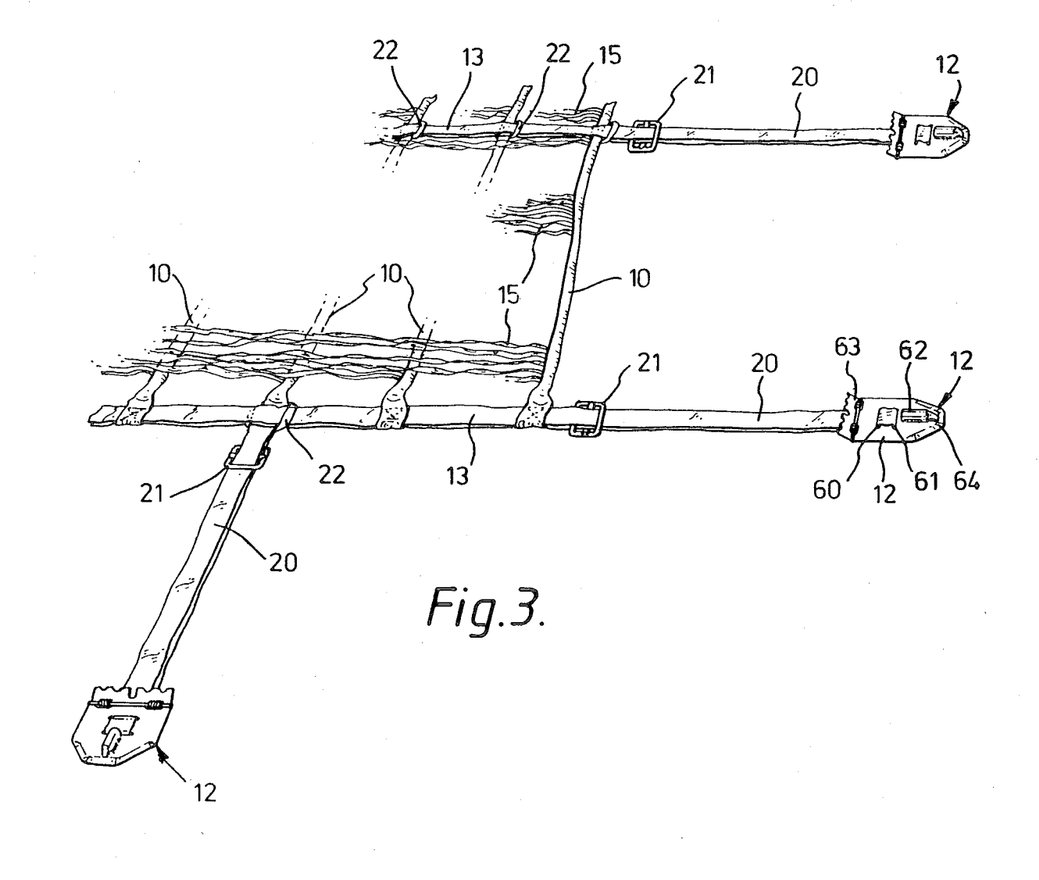
FIG. 3 ilustrates one corner of one of the frond mats before being wound on a roll, the anchor straps being extended outwards from the mat to clarify its structure.

Referring first to FIGS. 1 to 3, each frond mat consists of discrete frond lines 10 disposed generally parallel to a pipe line 11 and anchored to the sea bed firstly by ground anchor plates 12 at both ends of alternate lines 10 (only one end of each line being visible in the figure), and secondly by cross-straps 13 also anchored at both ends by ground anchor plates 12. The mats are positioned with the frond lines 10 generally transverse to the predominant current flow denoted by arrows 'A'.

In the figures, only three of the cross-over straps 13 are shown for the right-hand mat and only one cross-over strap is shown for the left hand mat. Moreover, at the corners of each mat, only one anchor plate 12 is required so that for the right hand mat no anchor plate is provided at the end of the first frond line and for the left hand mat no anchor plate is provided at the right hand end of the cross-strap 13.

FIG. 3 illustrates the right hand corner of the right hand mat in more detail before the mat is wound on a roll for deployment over the sea bed. It shows that each anchor plate 12 is located at the end of respective anchor straps 20 formed by extending the respective frond line 10 or cross-over strap 13, the extended end of each frond line being turned back on itself to form an end loop, while the cross-over straps including the extended ends are formed as continuous endless loops. The length of each anchor strap 20 is adjustable by means of a conventional strap buckle 21. To shorten the strap 20, a loop is formed in the strap and threaded back through the buckle in a conventional manner so that it cannot be withdrawn when the strap is subsequently tensioned.

The cross-over straps 13 each include attached loops 22 stitched to the strap at each cross-over point. When assembling the mat, a strap 13 is initially laid over the frond line 10 and the free end of the strap (i.e., the end to which no frond line has yet been attached) is then looped back on itself around the underside of the frond line and through one of the loops 22. The free end is then pulled back along the same path beneath the frond line so that the line is retained in the looped back portion of the strap 13 and is held by the loop 22 against the underside of the strap when the strap is pulled tight.

Referring now to FIGS. 4 to 8, strips 31 of fibrillated polypropylene are unwound from rolls 30, each roll providing a strip having a width of about 5 cm. The fibrillations are produced, for example, by a prior skiving process.

Figures 5, 6:
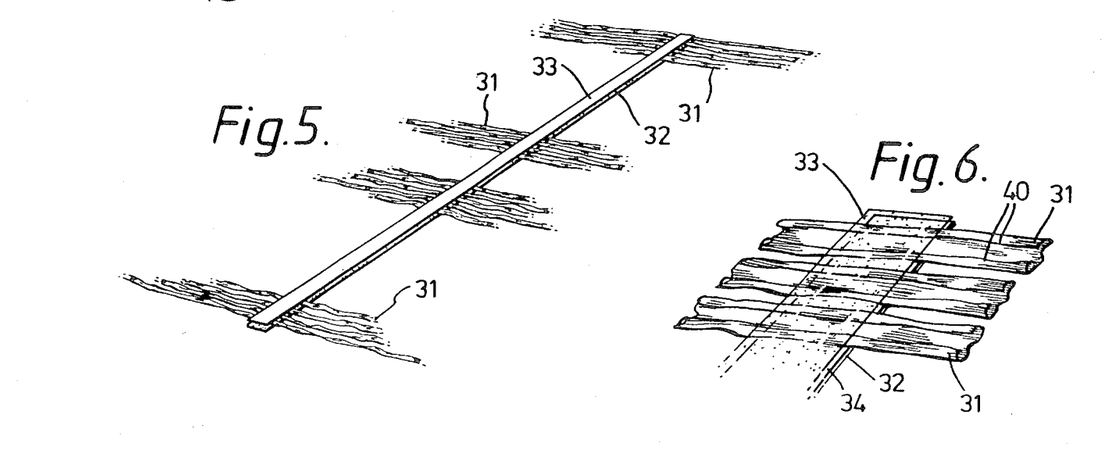
Figure 7:
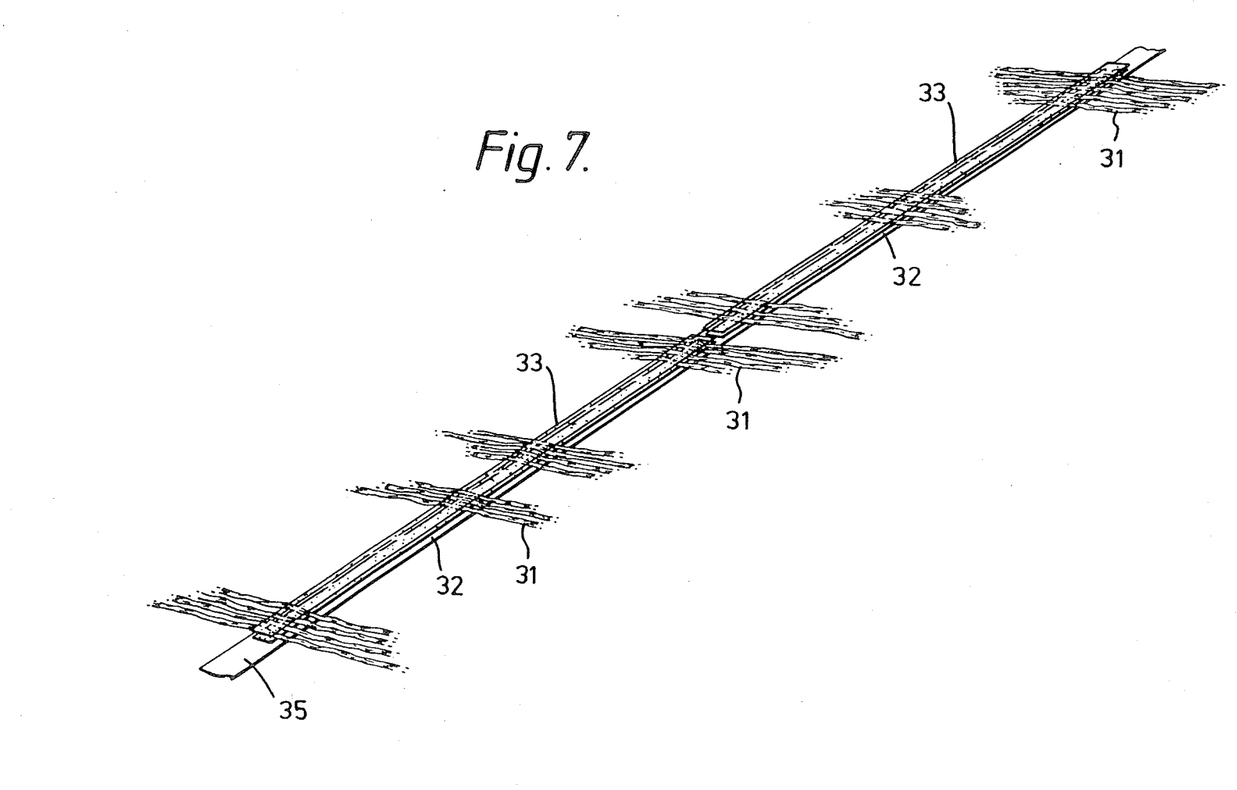

As best shown in FIG. 6, the strips have a natural crinkle or crimp and their longitudinal edges 40 have a natural tendency to curl inwards toward the centre of the strip. The strips therefore contract to a width of about 2–3 cms. Accordingly, when the strips 31 are laid across an adhesively backed bonding strip 32 as shown in FIGS. 5 and 6 and a second adhesive bonding strip 33 is then superposed on the strip 32, the contracted strips 31 are clamped between the superposed bonding strips to provide a mass of overlapping fibrils along the length of the bonding strip.

Figure 4:
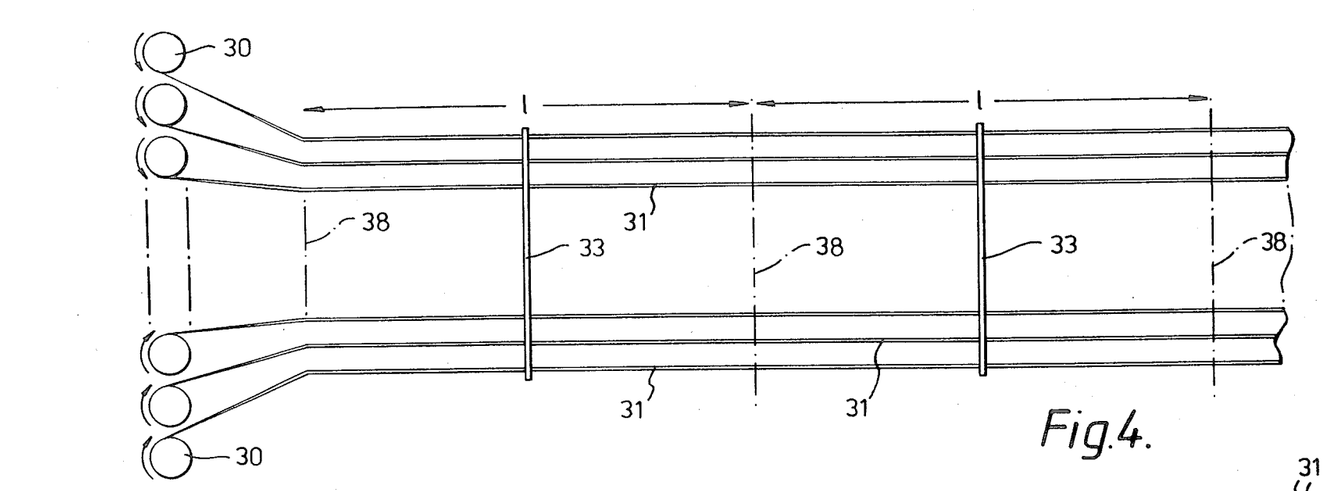
FIGS. 4–8 illustrate various steps in a process for producing a frond line embodying the invention.
Figure 8:
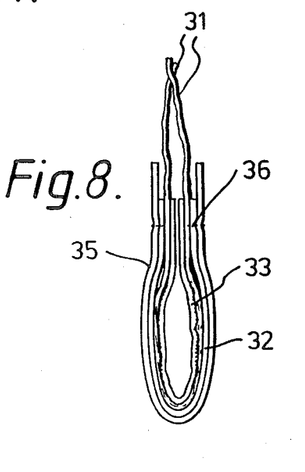

As shown in FIG. 4, the transverse bonding strips 32, 33 are provided at intervals along the length of the strips 31, and the strips 31 are then cut into lengths 'l' along the sever lines 38 so that equal lengths of the strips 31 extend each side of the bonding strips 32,33. The superposed bonding strips 32, 33 are then placed end-to-end along the length of a web 35 (FIG. 7) having a total length of 30 meters. A carrier for the adhesive backing of each strip 33 is then peeled away to expose the adhesive, and the web 35 is folded longitudinally as shown in FIG. 8. The exposed adhesive of strips 33 temporarily bonds the overlying portions of the fibrillated strips 31 to one another within the folded web 35, and the bond is then made permanent by stitching along the stitch line 36.

In this manner two contracted overlying strips of fibrillated material are formed from each single strip severed from the rolls 30, the strips being securely gripped within the folded web 35. A frond line having an exceptionally high density of fronds is thereby formed. Each of the frond lines 10 shown in FIGS. 1 to 3 is formed in this simple and convenient cost-effective manner.

Accordingly, each frond line 10 comprises a narrow folded web 30 meters in length and each frond 15 comprises contracted and overlying strips of fibrillated polypropylene secured to the web 10, each strip when unfurled having a width of about 5 cm and a height of between 1 and 2 meters. A total of 4,320 such strips are thereby provided along each web, each single strip being fibrillated to give a total of 216,000 thread-like filaments over the 30 meter web length when the strips are immersed in water, the individual filaments each having a break/strain of no less than 50 Kg.

For simplicity, the two mats of FIGS. 1 and 2 are each shown with only eleven frond lines. In practice, however, to achieve sufficient viscous drag, each mat should include twenty-one of these frond lines 10 at one-fourth meter pitch intervals to form a viscous drag barrier 5 meters wide for a length of 30 meters. Each mat therefore has approximately 4.5 million thread filaments.

The cross-over straps 13 are positioned at between 1 and 3 (preferably 1.5) meter pitch intervals along the length of the frond lines 10.

In cases where the seabed is sloping from, say, right to left, the left hand ends of the cross-over straps 13 of the right hand mat can be secured to the underneath of the pipeline. Where a deep scour trench has already been formed beneath a pipeline, both the left hand ends of the cross-over straps of the right hand mat, and the right hand ends of the cross-over straps of the left hand mat may be secured to the underneath of the pipeline.

For small pipelines with only light scour, a single mat may be positioned over the top of the pipeline and anchored to the sea bed on each side of the pipeline.

The exceptionally high density of thread filaments ensures that the filaments are not flattened by underwater currents and provides an effective viscous drag to cause deposition of transported particles suspended in the currents.

The high density of the filaments does however produce exceptionally high buoyancy forces so that holding down the mat requires particularly effective anchoring. Moreover, the current forces on the mass of fronds impose a total drag on the whole mat which will carry the mat away unless it is securely anchored.

Initial anchoring of each mat to the sea bed is especially critical, as it is not possible to put down a fully deployed mat due to its buoyancy and to hydraulic lift created by underwater currents. This problem is overcome by the use of the ground plate anchors 12 and by the mat being progressively unwound from a roll over the sea bed and anchored at the appropriate intervals.

The anchor plates 12 are described more fully and separately claimed in my co-pending application entitled 'Ground Anchoring system' being filed concurrently herewith. Briefly, as best illustrated in FIG. 3, each plate comprises a pair of slots 60, 61 for receiving and retaining the looped anchor strap 20, a socket 62 for receiving an extension rod of an hydraulic hammer tool, and a hinged spring-biased flap 63 extending rearwardly from the trailing edge of the plate. The hinged flap 63 is held by the extension rod in a cocked position against the spring bias while the leading edge 64 of the plate is being power driven into the river or seabed, and is then released to engage the side of the hole and provide a fulcrum about which the plate immediately pivots into a transverse locking position (as illustrated in FIGS. 1 and 2) when a lifting force is applied to the strap 20. In this position the plate is virtually impossible to extract from the ground and it provides a simple but secure anchoring method which is not subject to secondary scour.

Each plate 12 is driven into the river or sea bed to a depth determined by the length of the strap 20, the length being adjusted according to the required height of the mat above the bed. A particular advantage of this anchoring system is that each plate can be securely anchored in about 35 seconds.

I claim:

1. A frond line for filtering particulate material from currents flowing over a river or sea bed, the line comprising a multiplicity of elongate buoyant elements extending transversely and generally parallel with one another in a common direction from a flexible anchor line, the elements each having a base secured to the anchor line and a free end, the elements at least partially overlapping one another such that the free ends of the elements provide a dense substantially continuous curtain of elements along the line.

2. A frond line according to claim 1 in which the anchor line comprises superposed elongate webs of synthetic material having longitudinal edges, said webs being secured to one another along the longitudinal edges, the base of each buoyant element being gripped between the superposed webs and the elements extending outwardly from one of said edges.

3. A frond line according to claim 1 in which an anchoring strap is provided at one or both ends of the line, a ground anchor being attached to the end of the strap for securing the line to the river or sea bed, and the anchor including means for engaging a powered driving tool for driving the anchor into the river or sea bed.

4. A frond line according to claim 3 in which the length of the strap is adjustable.

5. A frond line according to claim 3 in which the anchor comprises a plate having at least one slot for receiving the anchoring strap.

6. A frond line according to claim 2 in which the superposed webs comprise longitudinally folded over portions of a single web.

7. A frond line according to claim 1 in which the anchor line comprises superposed elongate webs defined by a single web longitudinally folded double, the base of each buoyant element being gripped between the superposed webs.

8. A frond line according to claim 1 in which each element comprises a fibril in a fibrillated strip, the strips having a natural crimp or curl and being transversely folded double to further increase the density of fibrils along the length of the anchor line.

9. A frond mat for controlling erosion of a river or sea bed, the mat comprising an array of spaced generally parallel frond lines, each line comprising a substantially continuous curtain of elongate buoyant elements extending transversely in a common direction from a flexible anchor line, a plurality of spaced generally parallel straps disposed transverse to the array of frond lines to provide an open grid mat structure, and means for anchoring at least one end of at least one of the lines or straps to the river or sea bed.

10. A frond mat according to claim 9 in which each anchor line comprises a pair of superposed webs, the base of each buoyant element being gripped between the superposed webs.

11. A frond mat according to claim 10 in which the transverse straps are interconnected with the frond lines at each cross-over point.

12. A frond mat according to claim 11 in which a retaining loop is attached to the respective strap at each cross-over point, the strap passing over the frond line and then being fed back on itself around the frond line and through the loop to provide a retaining knot.

13. A frond mat according to claim 9 in which the anchoring means comprises a plurality of anchoring straps depending from the grid, each anchoring strap being provided with a ground anchor for driving the strap into the river or sea bed.

14. A method of producing a frond line for filtering particulate material from currents flowing over a river or sea bed, the method comprising providing an anchor line in the form of a flexible elongate web of synthetic material, disposing discrete transverse strips of synthetic buoyant material side by side along the length of the web with substantially equal lengths of the strip extending outwardly in opposite directions from the opposed longitudinal edges of the web, folding the web longitudinally such that each transverse strip is folded double and the two ends of the strip extend in a common direction from the web, and securing the superposed longitudinal edges of the web to one another such that the folded ends of the transverse strips are gripped and retained between the superposed edges.

* * * * *

UNITED STATES PATENT AND TRADEMARK OFFICE
CERTIFICATE OF CORRECTION

PATENT NO. : 4,722,639

DATED : February 2, 1988

INVENTOR(S) : Peter Alsop

It is certified that error appears in the above-identified patent and that said Letters Patent is hereby corrected as shown below:

Column 6, line 43, --flexible-- should appear before "straps";

Signed and Sealed this

Twentieth Day of September, 1988

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,722,639

DATED : February 2, 1988

INVENTOR(S) : Peter Alsop

It is certified that error appears in the above-identified patent and that said Letters Patent is hereby corrected as shown below:

Column 6, line 43, --flexible-- should appear before "straps"; and

Column 6, line 44, --flexible-- should appear before "mat".

This Certificate to supersede Certificate of Correction issued Sept. 20, 1988.

Signed and Sealed this

Fifteenth Day of November, 1988

Attest:

DONALD J. QUIGG

Attesting Officer

Commissioner of Patents and Trademarks